June 14, 1949.   C. E. KERR   2,473,063
SHEAR TENDERNESS TESTER
Filed Feb. 25, 1946   7 Sheets-Sheet 5
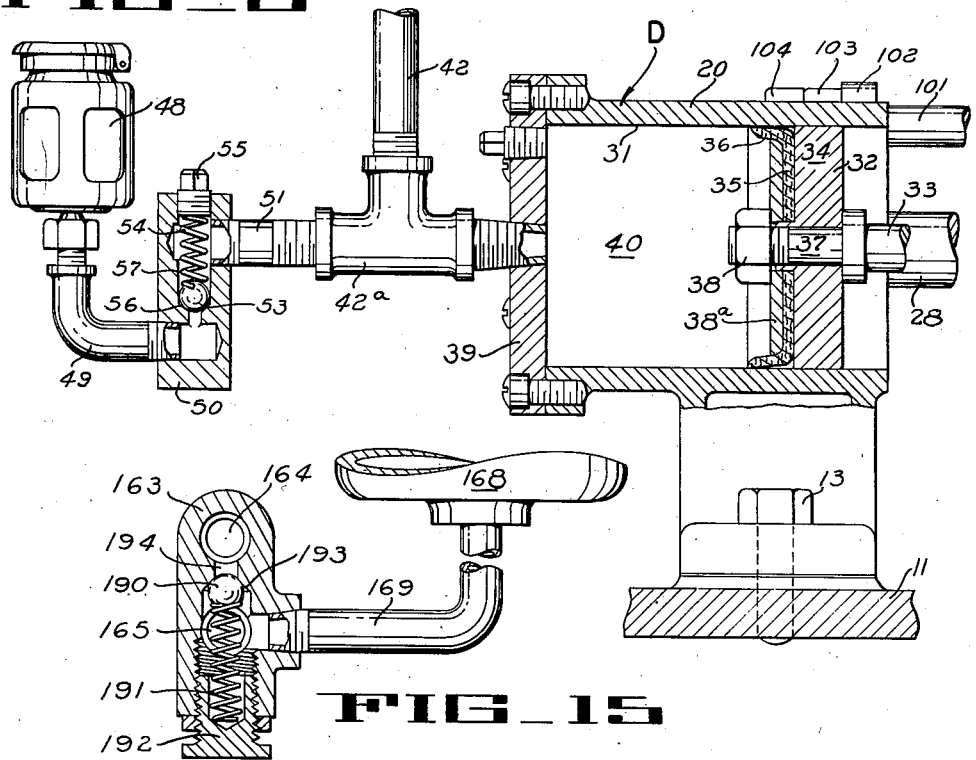
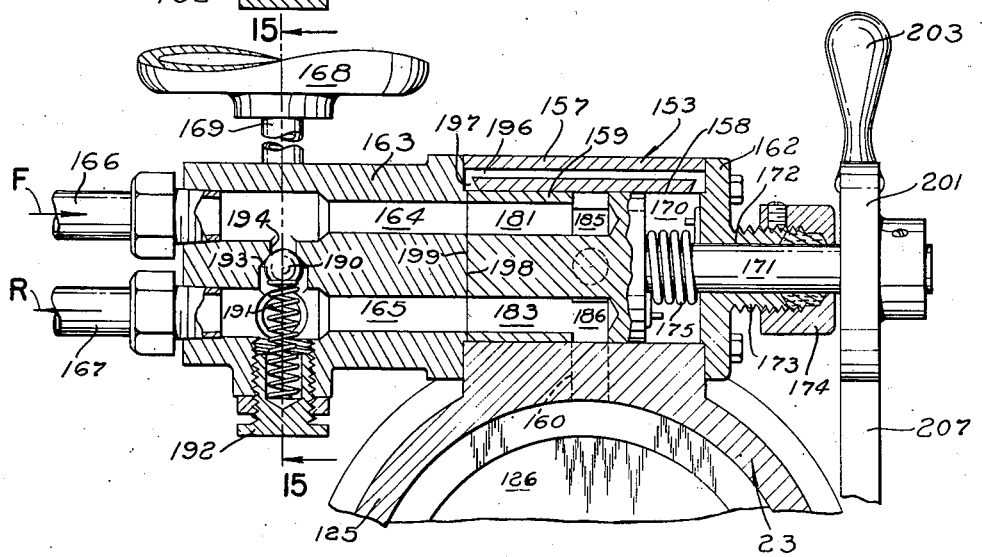
INVENTOR
*CHARLES E. KERR*
BY
ATTORNEY June 14, 1949. C. E. KERR 2,473,063
SHEAR TENDERNESS TESTER
Filed Feb. 25, 1946 7 Sheets-Sheet 6
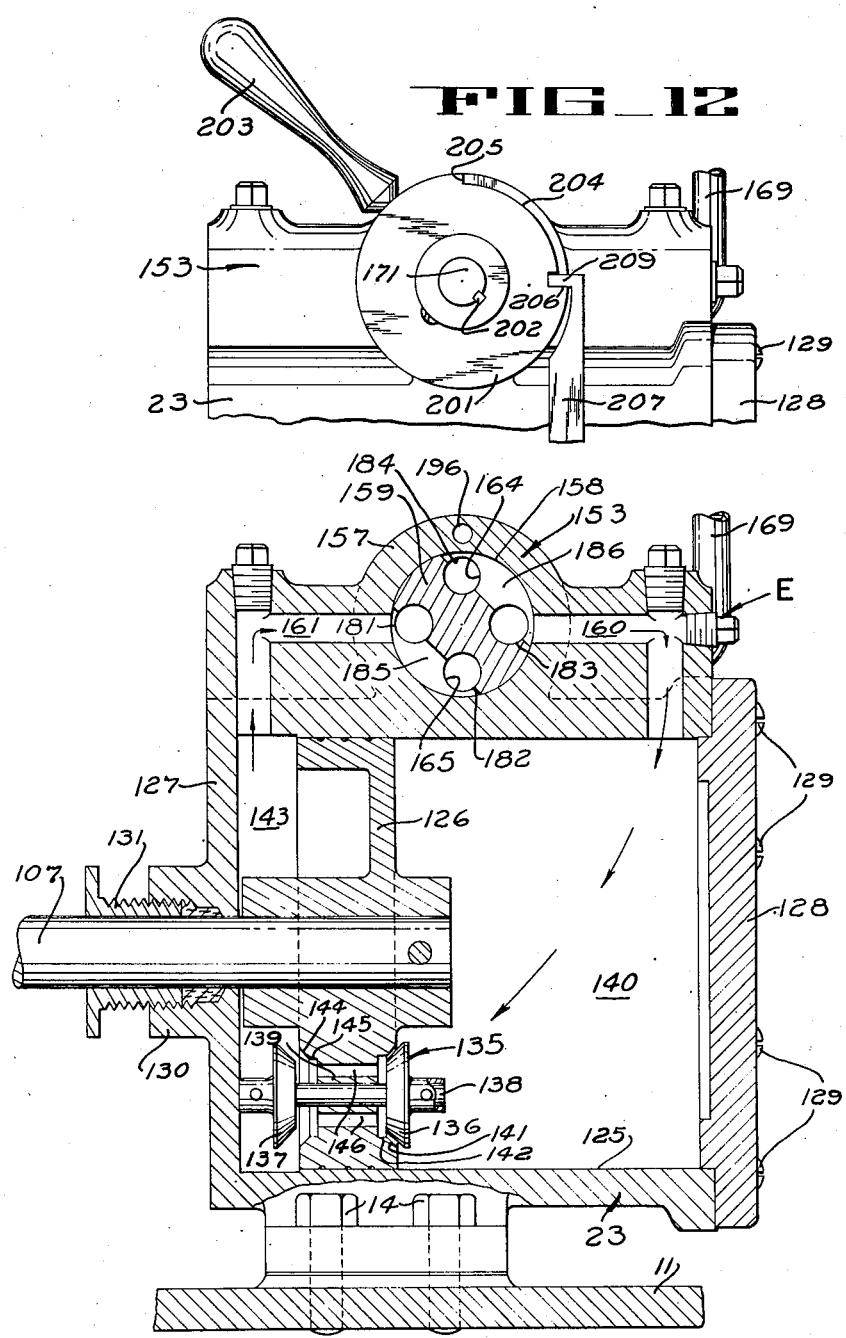
INVENTOR
CHARLES E. KERR
BY Philip A. Minnis
ATTORNEY June 14, 1949.    C. E. KERR    2,473,063
SHEAR TENDERNESS TESTER
Filed Feb. 25, 1946    7 Sheets-Sheet 7
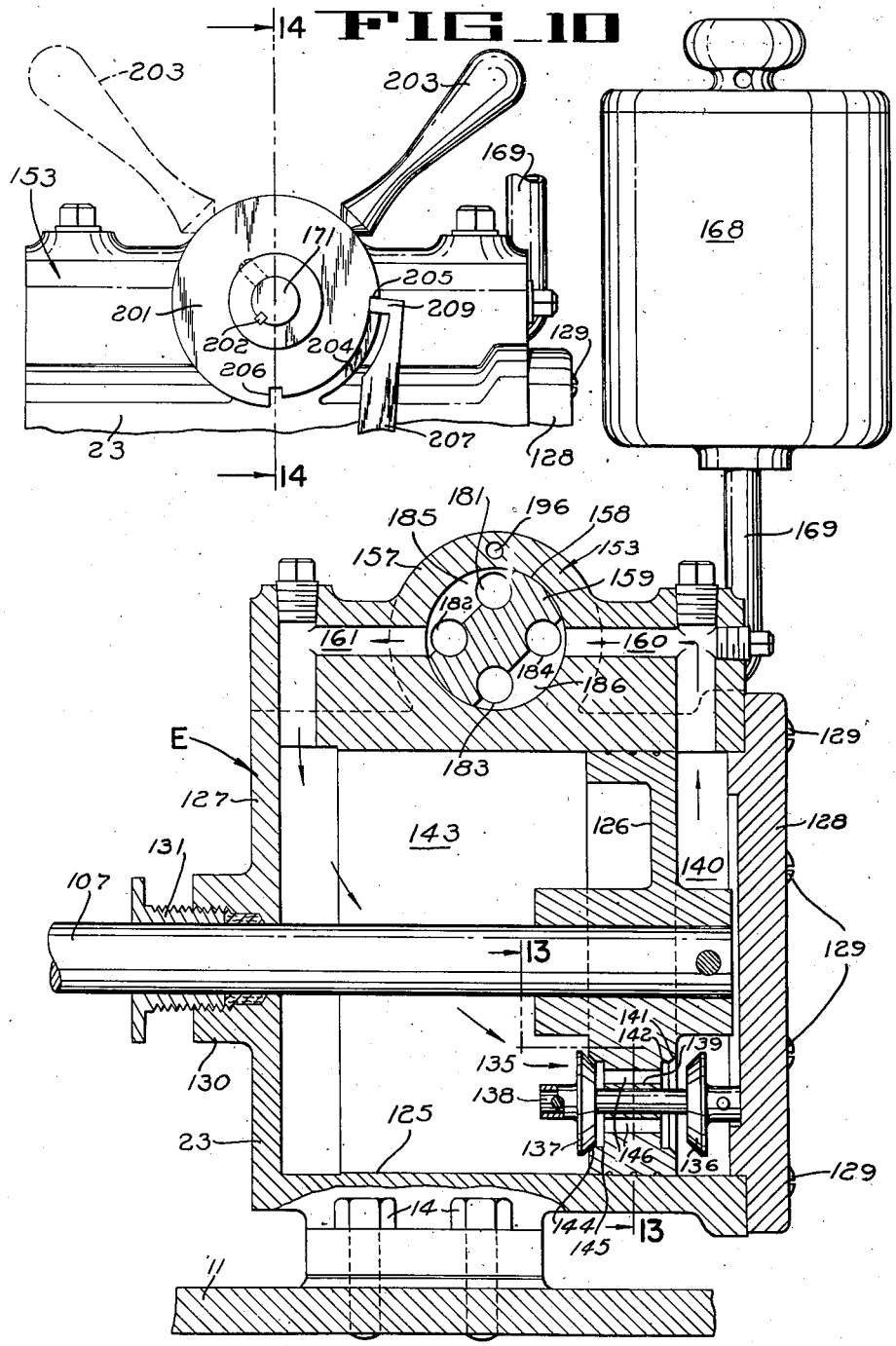
INVENTOR
CHARLES E. KERR
BY Philip G. Minnis
ATTORNEY Patented June 14, 1949

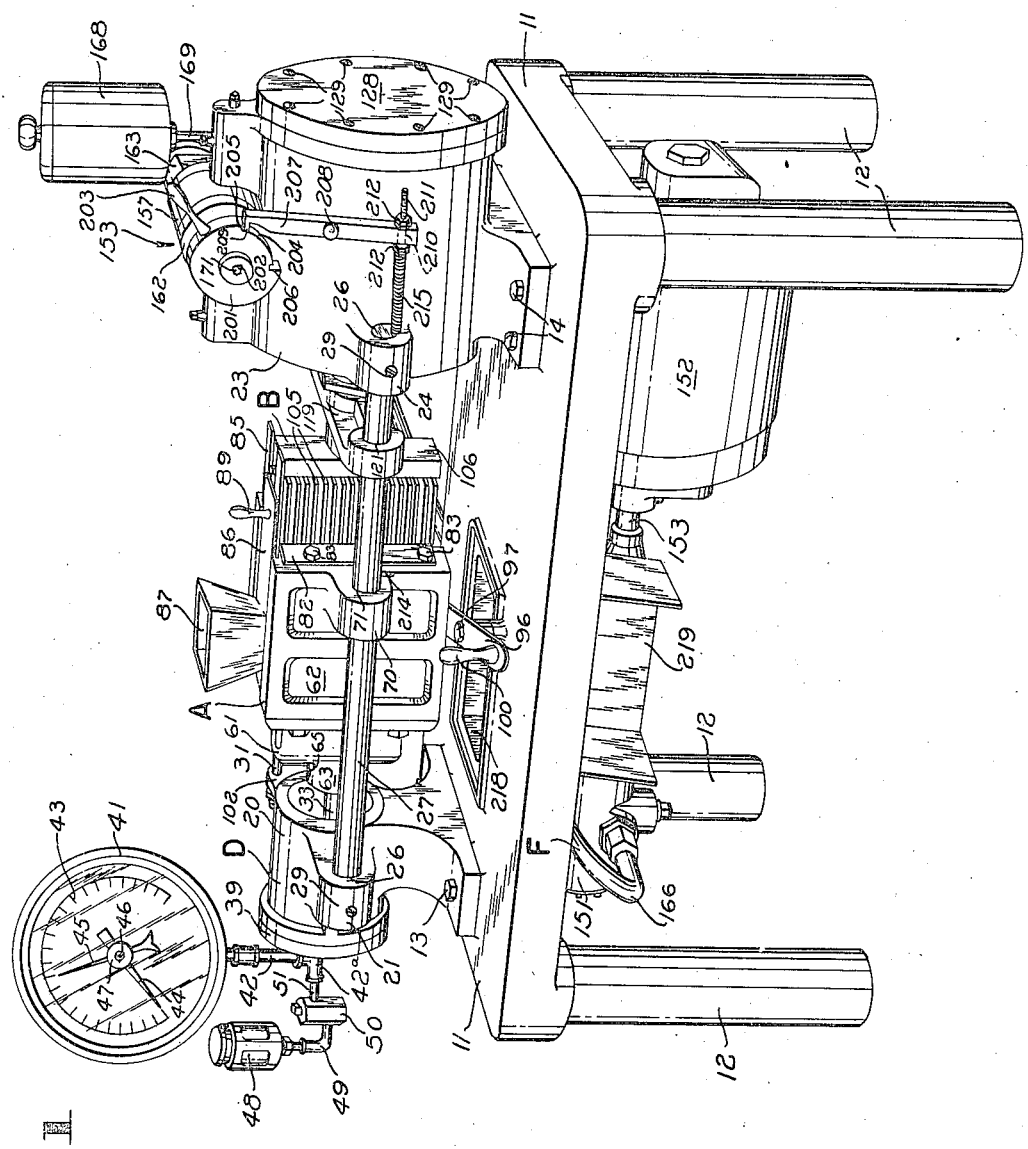

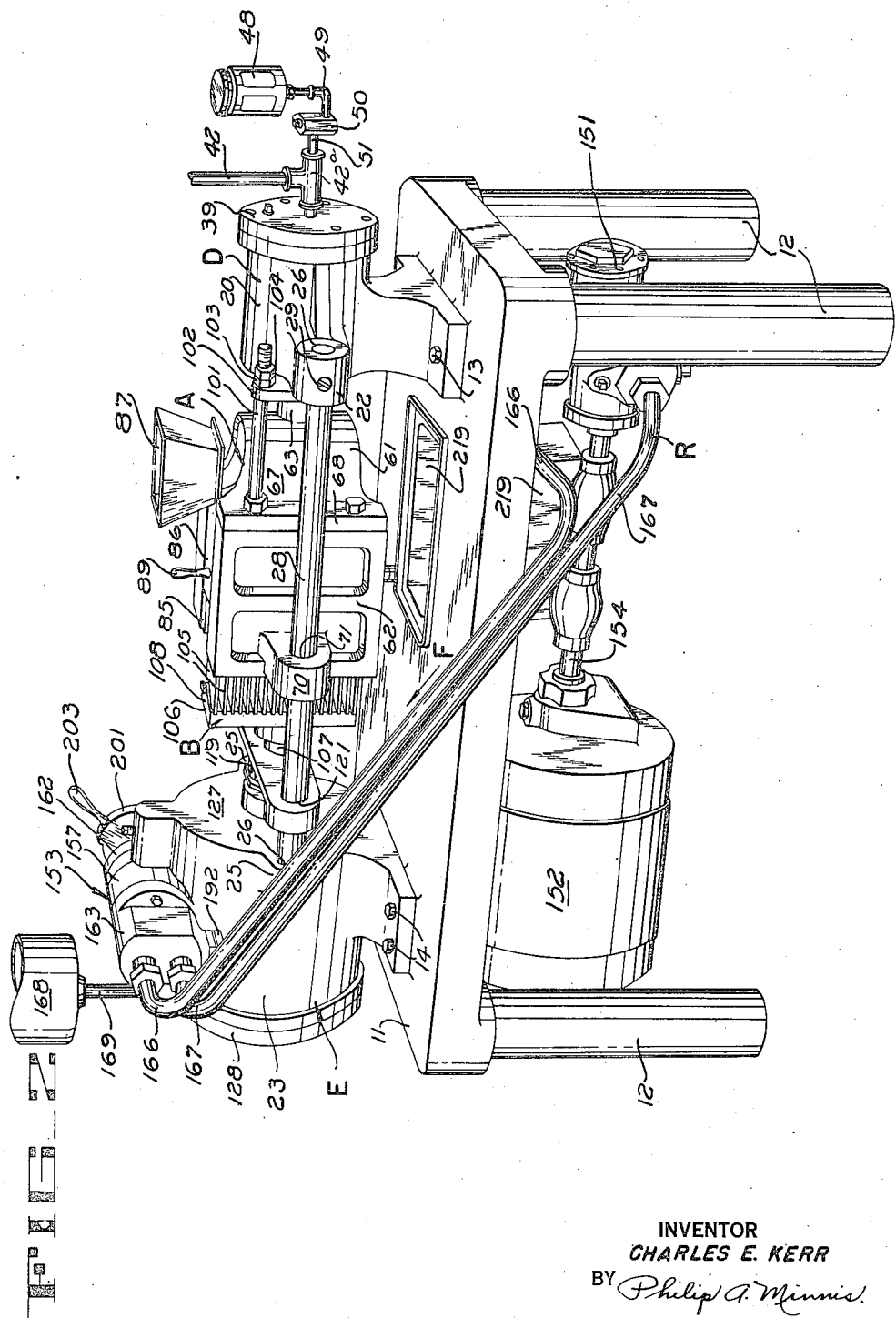

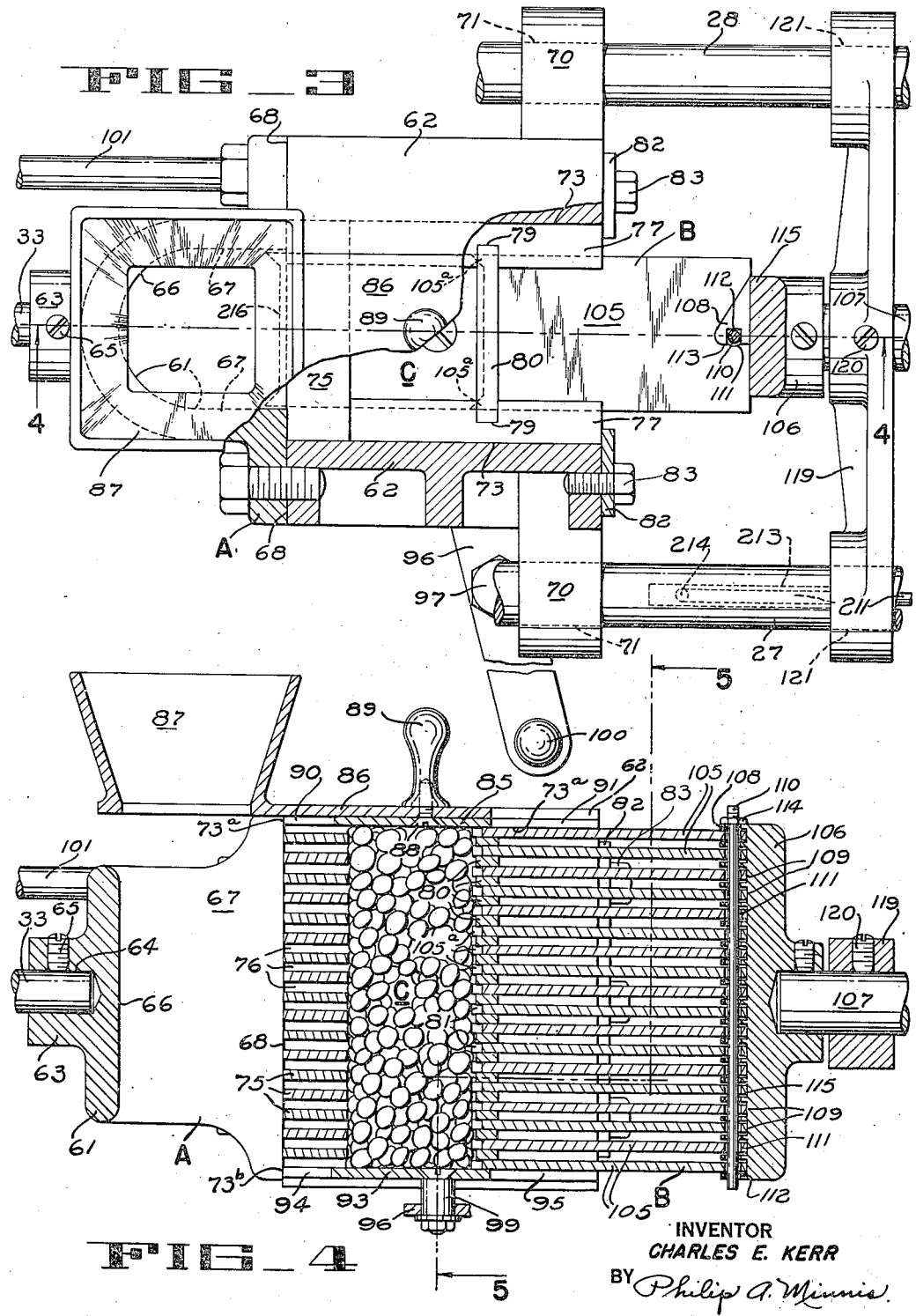

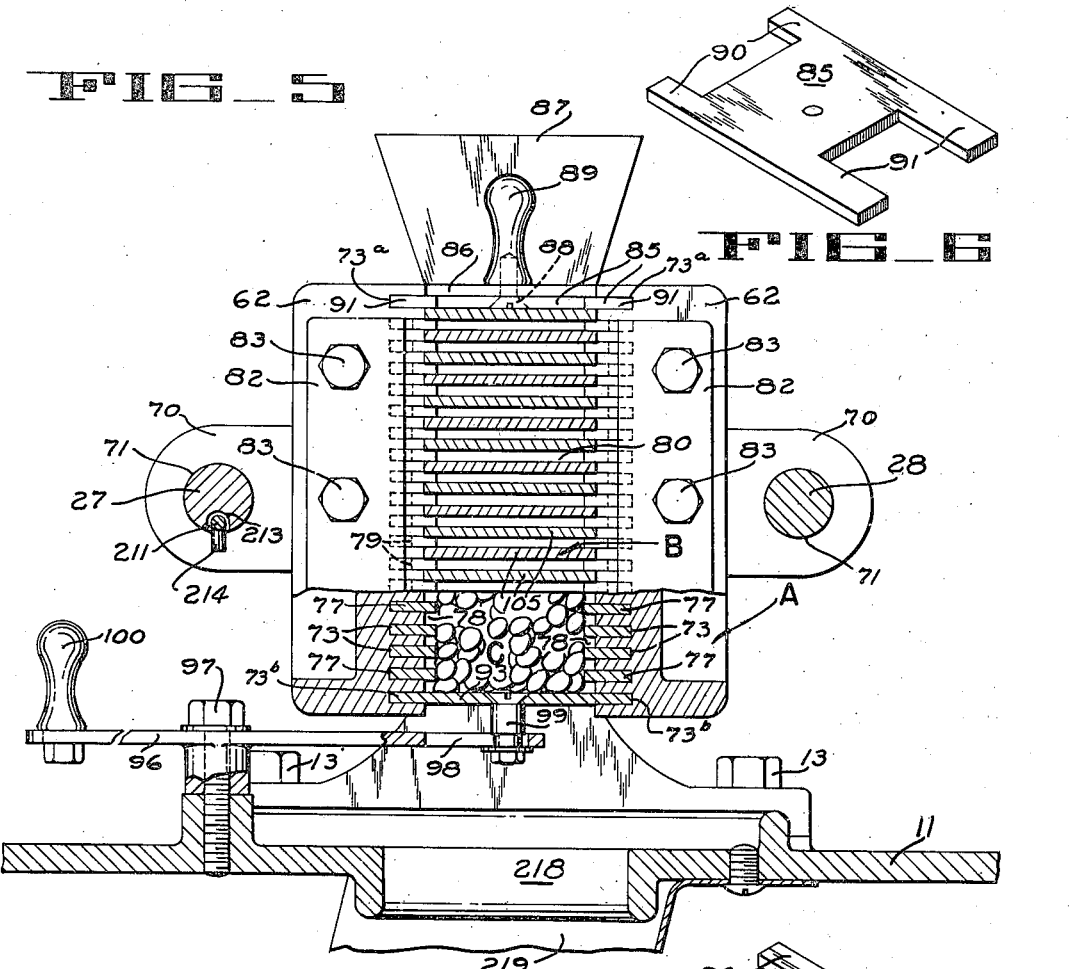
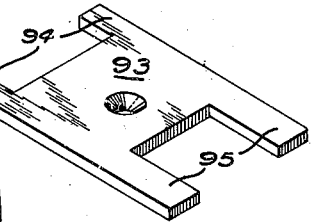
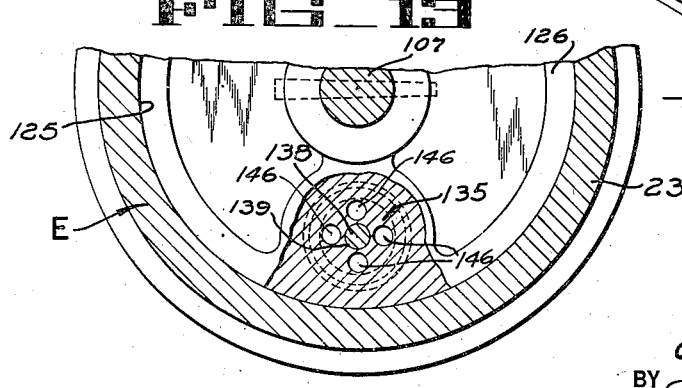

2,473,063

UNITED STATES PATENT OFFICE 2,473,063

SHEAR TENDERNESS TESTER

Charles E. Kerr, Hoopeston, Ill., assignor to Food Machinery and Chemical Corporation, a corporation of Delaware Application February 25, 1946, Serial No. 650,013

20 Claims. (Cl. 73—101)

This invention relates to tenderness testing machines and is concerned with the provision of an improved machine which may be used for testing the tenderness of a wide variety of products, such as certain fresh vegetables, including peas, green beans, lima beans, whole kernel cut corn, asparagus, and the like; fish, shrimp, crab and other sea foods; meats; bread, cake and other bakery products; etc. For purposes of convenience, however, I shall herein disclose and describe my invention more particularly as it may be utilized for the testing of fresh peas.

It is fairly common practice in the canning industry at the present time to test peas for tenderness and to pay the grower on the basis of such tests, the younger and more tender peas bringing a higher price than the older and tougher peas. It is highly important therefore that the tests be conducted with a high degree of accuracy and it is one of the principal objects of my invention to provide a tenderness testing machine which is uniformly and highly accurate in its operation.

More specifically it is an object of my invention to provide a testing device adapted to determine the tenderness of a product by shearing a test sample of the product confined within a chamber and accurately measuring the resistance of the product to the shearing action.

Another object of the invention is to provide an apparatus for determining the tenderness of a product which is capable of handling a wide range of resistance pressures with accuracy and without the necessity of adjustment.

It is also an object of the invention to provide an apparatus of the character referred to which has a series of grid units composed of shearing blades arranged in telescoping relationship with each other and in which frictional contact between the blades is greatly reduced or substantially eliminated.

A further object of the invention is to provide a testing apparatus of the above type employing cooperating sets of shearing blades in which one set of blades is floatably mounted for telescoping movements with the other set of blades.

Another object of the invention is to provide means for applying and accurately measuring the force or pressure required to shear a product confined in a chamber, the force or pressure being applied to the product through shear blades movable through aligned slots formed in opposed walls of the chamber.

A still further object of the invention is to provide simple and dependable means for exerting a steady, non-fluctuating, and accurately measurable force or pressure on the product being tested, and to accomplish this result by the use of a fluid pressure motor.

Another object of the present invention is to provide an apparatus for determining the tenderness of a product in which a minimum of parts are exposed to the deteriorating action of water, juices, and the like.

Another object of the present invention is to provide an apparatus for determining the tenderness of a product which is of practical construction, adequately and uniformly powered, and sufficiently compact in structure as to lend itself to minimum of space consumption.

Additional objects and advantages of the invention will more readily appear from the following description of a preferred embodiment, as illustrated in the accompanying drawings, in which:

Fig. 1 is a perspective looking at the front of a testing machine constructed according to the present invention, the parts being shown in position to receive a batch of peas;

Fig. 2 is a perspective looking at the rear of the machine shown in Fig. 1, the parts being shown in position to make a test and the pressure gauge being omitted;

Fig. 3 is a plan, partly in horizontal section, of the portion of the machine having the telescoping grid units;

Fig. 4 is a vertical longitudinal section taken along line 4—4 of Fig. 3;

Fig. 5 is a vertical transverse section taken along the line 5—5 of Fig. 4;

Fig. 6 is a perspective of the top cover plate for the testing chamber;

Fig. 7 is a perspective of the bottom closure plate for the testing chamber;

Fig. 8 is a side elevation, partly in vertical longitudinal section, of the pressure measuring means shown at the left hand end of Fig. 1;

Fig. 9 is a vertical longitudinal section of the power transmitting mechanism shown at the right hand end of Fig. 1, the fluid reservoir being shown in elevation, and the piston of the fluid motor being shown in inactive position at one end of its cylinder;

Fig. 10 is a side elevation of a portion of the fluid motor cylinder of the power transmitting mechanism, showing the exposed elements of the valve device and associated parts for controlling the operation of the fluid motor in the normal inactive position when the piston of the fluid motor is disposed within the cylinder in the manner shown in Fig. 9;

Fig. 11 is a longitudinal section similar to Fig. 9, showing the piston of the fluid motor at the left hand end of the fluid motor cylinder;

Fig. 12 is an elevation similar to Fig. 10, showing the exposed parts of the control valve device in position to initiate movement of the fluid motor piston from the position shown in Fig. 9 to the position shown in Fig. 11;

Fig. 13 is a vertical transverse section taken along the line 13—13 of Fig. 9;

Fig. 14 is a vertical section of the control valve device taken along the line 14—14 of Fig. 10; and Fig. 15 is a vertical transverse section taken along the line 15—15 of Fig. 14.

In general the testing machine of the present invention (see Figs. 1, 2, 3 and 4) comprises a pair of telescoping grid units A and B so constructed and arranged with respect to each other as to provide, when the grid unit B is in a retracted position with respect to the grid unit A, a chamber C (Figs. 3 and 4) therebetween for a batch of peas to be tested. Normally, the grid unit A is yieldably held in a predetermined position by a pressure measuring device D, and the grid unit B is telescoped within the grid unit A by power transmitting mechanism E so as to first compact and then shear through the peas within the chamber C. The resistance of the peas within the chamber C to the shearing action of the grid unit B is transmitted by the grid unit A to the pressure measuring device D and the latter indicates the tenderness of the batch of peas being tested so that the operator can determine their grade.

Referring to the specific construction of the embodiment of the testing machine illustrated in the accompanying drawings, a suitable frame is provided, comprising a platform or base 11 to which are attached legs 12 for supporting the base from a bench or the like (not shown).

The pressure measuring device D is fixedly mounted on the base 11 by means of securing elements 13 (Figs. 1, 2, 5 and 8), and the power transmitting mechanism E is likewise fixedly mounted on said base by securing elements 14 (Figs. 1, 2, 9 and 11). The pressure measuring device D is preferably located adjacent one end of the base 11, and the power transmitting mechanism E is located adjacent to the other end of the base.

As shown in Figs. 1, 2 and 8, the pressure measuring device D comprises a cylinder block or body 20 having a pair of diametrically disposed ears 21, 22, formed on its exterior adjacent to one end thereof. As shown in Figs. 1 and 2, the power transmitting mechanism E comprises a cylinder block or body 23 having a pair of diametrically disposed ears 24, 25, formed on the exterior thereof. The ear 21 of cylinder 20 aligns with the ear 24 of cylinder 23, and the ear 22 of cylinder 20 aligns with the ear 25 of cylinder 23. All of the ears are bored, as indicated at 26, Figs. 1 and 2, to provide aligned pairs of openings. The openings 26 of the ears 21, 24 receive the ends of a guide rod 27, and the openings 26 of the ears 22, 25 receive the ends of a guide rod 28. The guide rods 27, 28 are held fixedly mounted in the ears, respectively, by set screws 29.

It will be seen in Figs. 1 and 2, that the longitudinal center line of the cylinder block 20 is arranged in alignment with the longitudinal center line of the cylinder block 23, and the construction and arrangement of the parts above described is such that the guide rods 27, 28 are disposed at opposite sides of the two cylinder blocks 20 and 23, with the centers of said guide rods located in the horizontal plane of the longitudinal center line of said cylinder blocks. The bodies of the cylinder blocks 20 and 23 provide standards by which the guide rod 27, 28 are carried. The purpose of the guide rods 27, 28 is to provide supporting means for the grid units A and B.

The cylinder block 20 of the pressure measuring device D is formed with a cylindrical bore 31 (Fig. 8), for a piston 32 on one end of a piston rod 33 which extends outwardly from the cylinder toward the yieldable grid unit A heretofore referred to.

The piston 32 is formed of a metallic disc 34, to the inner face of which there is mounted a leather sealing cup 35 having a peripheral outturned edge portion 36 in leakproof engagement with the surface of the cylinder 31. The disc 34 and the leather cup 35 are mounted on the reduced end portion 37 of the piston rod 33 and are held thereon by means of a nut 38 and washer 38ª as shown in Fig. 8.

The forward end of the cylinder 31 is open, as seen in Fig. 1, while the other end of said cylinder is closed by means of a removable cylinder head or cover 39 (Figs. 1, 2 and 8). The chamber 40 within the cylinder 31 between the piston 33 and the cylinder head 39 communicates with a pressure gauge 41 connected to the chamber by a pipe 42 and T fitting 42ª. The chamber 40 and pipe connection leading to the gauge 41 are kept completely filled with an operating liquid such as oil so that the gauge 41 is instantly responsive to any movement of the piston 32.

As shown in Fig. 1 the pressure gauge 41 is of a well known type comprising a graduated dial 43 over which works an indicating hand 44 and a limit hand 45, both mounted on a shaft 46 of said gauge. The indicating hand 44 is fixed to shaft 46 so that when said shaft is rotated by the operating mechanism of the gauge (not shown) as the result of displacement of the operating liquid in chamber 40 by piston 32 being moved towards the left (Figs. 1 and 8), the indicating hand 44 will indicate on the graduations 43 the amount of resistance offered by the batch of peas being tested by the machine. The limit hand 45 is loosely mounted on the shaft 46 and is actuated in the customary manner by forward movement of the indicating hand 44 to register on the graduated dial 43 the limit of travel of hand 44. Upon the return movement of the indicating hand 44, the limit hand 45 remains at its forward position until it is manually returned to the starting position by the operator turning nut 47 on the outer end of shaft 46.

As shown best in Fig. 8, suitable means may be provided for maintaining chamber 40 and the pipe connections to the gauge 41 full of oil. In the instant case such means are shown as comprising an oil reservoir 48 which is connected to the pipe 42, through pipe 49, control valve device 50, pipe 51, and T connection 42ª. The control valve device 50 comprises a valve ball 53 backed by a spring 54, the pressure of which can be varied by adjusting the retaining plug 55. The ball 53 is normally held by the spring against a seat 56 to cut off communication from the reservoir 48 to the pipe 42, through passageway 57 in the valve device so that no oil flows from the reservoir 48 into the pipe 42 and as long as the oil line 42 and chamber 40 are completely full the ball valve 53 will remain seated. However, if the quantity of oil in pipe 42 and chamber 40 is reduced in volume by leakage or otherwise a vacuum will be created when the piston 32 travels toward the open end of the cylinder 31. As the result of the vacuum, the ball 53 will be unseated against the pressure of spring 54 and sufficient oil to replenish the loss will flow through conduits 49, 57 and 51 into pipe 42. The vacuum is then broken and the ball 53 is again seated by spring 54 to cut off communication from the reservoir 48 to pipe 42.

The yieldable grid unit A, Figs. 3, 4 and 5, comprises a substantially rectangular body having a supporting yoke 61 at one end and a pair of spaced sides 62 which extend forwardly from the yoke. The yoke 61 is substantially U-shaped in plan, as seen in Fig. 3, said yoke being formed with a rearwardly extending boss 63 having a hole or opening 64 formed lengthwise therein for the reception of the forward end of the piston rod 33 of the pressure measuring device D.

The piston rod 33 is fixedly secured within the boss 63 by means of a set screw or other suitable fastening means, indicated at 65, Figs. 3 and 4. The hole 64 extends only part way through the boss 63 so that the arcuate wall 66 of the yoke 61 presents a solid unbroken front surface, Fig. 4. The two legs 67 of the yoke 61 terminate in vertically disposed flanges 68 having flat faces to which are secured the ends of the sides 62. The sides 62 of the grid unit A constitute holders for a plurality of grid plates to be hereinafter described, these holders being spaced apart a suitable distance and being arranged parallel with respect to each other.

Projecting outwardly from the outer face of each side 62, is a boss 70 (Fig. 5), having a hole 71 formed therein through which the guide rods 27 and 28 extend. The guide rod 27 extends through the hole 71 of the holder 62 at one side of the grid unit A, and the guide rod 28 extends through the hole 71 of the holder 62 at the other side of the grid unit, said guide rods being mounted in said bosses so that the grid unit A is slidable freely lengthwise on the guide rods.

Formed in the inner walls of each holder 62, are a series of horizontally disposed equally spaced apart slots or grooves 73 (Fig. 5), which extend lengthwise of each holder 62 (Fig. 3), said slots being closed at one end by the vertical faces of the flanges 68 of the yoke 61. The slots or grooves 73 of one holder 62 are horizontally aligned with respect to the slots or grooves 73 of the other holder 62, as shown in Fig. 5.

A series of vertically spaced grid plates 75 extending transversely between the holders 62 at the rear of the chamber C have their ends seated in each of the aligned pairs of slots 73, excepting only the uppermost and lowermost pairs of slots, 73ª and 73ᵇ respectively, in which no grid plates 75 are mounted. The grid plates 75 are arranged with one longitudinal edge of each plate disposed against the faces of the vertical flanges 68 of the yoke 61 and they constitute the stationary shearing blades of the apparatus. The longitudinal edges of the grid plates 75 opposite to the edges which abut the flanges of the yoke 61 are arranged in vertical alignment as seen in Fig. 4, and those edges of said grid plates taken collectively constitute one of the walls of the chamber C heretofore referred to, said wall having a series of horizontal openings 76 arranged transversely thereof and defined by the spaces between grid plates 75. The purpose of the horizontal transverse openings 76 will be hereinafter described.

Also seated within the slots or grooves 73 in which the grid plates or shearing blades 75 are mounted, and extending longitudinally of each holder 62, are guide strips 77, the rear ends of which abut against the front edges of the grid plates 75. These guide strips are so constructed and arranged that they provide longitudinal ribs at each side of the chamber C, which ribs are located in the planes of the grooves or slots 73 and provide between them longitudinal guideways 78 which are located in the planes of the transverse openings 76 for a purpose to be hereinafter described.

Each longitudinal rib 77 is formed intermediate its length with a notch 79 (Fig. 3). The notches 79 in the ribs 77 at one side of the grid unit A are all arranged in vertical alignment with each other, and likewise the notches 79 in the ribs 77 at the other side of the grid unit are all arranged in vertical alignment with each other, all of said notches being disposed the same distance inwardly from the front end of said grid unit. Mounted in aligned pairs of notches 79 and extending transversely of the grid unit A, are grid plates 80 which are of somewhat less width than the width of the grid plates 75 and provide cleaning or scraping blades at the front portion of the chamber C. The longitudinal edges of the scraping blades provided by the grid plates 80 are arranged in vertical alignment (Fig. 4), and the inner edges of said scraping blades taken collectively constitute the outer transverse wall of the chamber C, said wall having a series of horizontal openings 81 arranged transversely thereof and defined by the spaces between the series of vertically disposed scraping blades 80. The openings 81 in the front wall of the chamber C and the openings 76 in the rear wall of said chamber are disposed in the same horizontal plane as is the plane of the guideways 78 at each side of the chamber C.

The shearing blades provided by the grid plates 75 and the longitudinal ribs provided by the guide strips or ribs 77 are retained in the slots 73 against lengthwise movement thereof, by end straps 82 which are secured to the outer ends of the holders 62, by screws 83 (Fig. 5).

From the foregoing it will be noted that the chamber C is located at the end of the grid unit A having the yoke 61 and that the sides 62 extend forwardly from the front of the chamber C defined by the scraping blades 80, so that the guideways 78 at each side of the chamber C likewise extend forwardly a suitable distance beyond the front of said chamber for a purpose to be hereinafter described.

Slidably mounted within the guideways provided by the slots 73ª at the extreme upper portion of the grid unit A, is a cover plate or slide 85 (Figs. 5 and 6), to which is secured the rearwardly extending base 86 of a feed hopper or funnel 87. The base 86 of the feed hopper 87 may be secured to the cover plate 85 by means of an inverted screw 88 which extends upwardly through the members 85 and 86. A handle 89 is threadedly mounted on the upper projecting portion of the screw 88. The construction and arrangement of the cover plate 85 and the feed hopper 87 is such that when the cover plate 85 is in one position it closes the top of the chamber C, and the feed hopper 87 is disposed in an offset position with respect to said chamber. In the present instance the feed hopper 87 is disposed above the yoke 61 when the cover plate is positioned to close the top of the chamber C (Fig. 4). When the cover plate 85 and feed hopper 87 are shifted toward the right by means of operating handle 89, the open bottom of the feed hopper can be brought into registration with the upper end of the chamber C so that a batch of peas can be fed through said hopper into said chamber (Fig. 1).

In order to render the cover plate 85 and the feed hopper 87 stable, the cover plate (Fig. 6) is formed with elongated portions 90 and 91 which extend in opposite directions from both ends of said cover plate, said extended portions being mounted within the guideways provided by the slots 73ª. The portions 90, 91 provide spaced apart legs, the legs 90 being located adjacent to the bottom of the feed hopper 87. The space between the legs 90 form an opening which can be registered with the top of the chamber C by sliding the cover plate 85 and feed hopper 87 lengthwise of the grid unit A. As shown in Fig. 4 when the cover plate 85 is positioned to close the top of chamber C, the extremities of the legs 90 abut the surface 68 of the yoke 61 and in this manner the shifting movement of the cover plate 85 and the funnel 87 mounted thereon is arrested.

As shown in Figs. 4, 5 and 7, slidably mounted within the guideways provided by the slots 73ᵇ at the extreme lower portion of the grid unit A, is a base plate 93 having elongated end portions 94, 95 which extend in opposite directions from the main body of the base plate and are disposed in said slots. The construction of the base plate 93 is substantially similar to the construction of the cover plate 85, the base plate normally being positioned to close the bottom of the chamber C. When the base plate 93 is moved lengthwise in the slots 73ᵇ, the open space at the end thereof between the extensions 94 is adapted to be registered with the bottom of the chamber C so that the contents of said chamber can be discharged therefrom.

For manually operating the base plate 93, I provide suitable mechanism comprising a lever 96 pivotally mounted intermediate its length on the base 11, as indicated at 97 (Figs. 1 and 5). One end portion of the lever 96 has a slot 98 formed lengthwise thereof, in which slot is disposed a roller 99 mounted on the underside of the base plate 93. An operating handle 100 is fixed to the outer end portion of the lever 96 by which said lever is adapted to be operated to slide the base plate 93 lengthwise of the slots 73ᵇ from and to chamber closing position.

In order to maintain the yieldable grid unit A in a predetermined position between testing operations, there is provided a rod 101 (Figs. 2 and 3) having one end secured to the yoke 61 and its other end portion extending through an opening in an ear 102 fastened to the stationary cylinder block 20 of the pressure measuring device D (Fig. 2). A nut 103 is threadedly mounted on the outer end of rod 101 to form a stop against the ear 102, and this nut is retained in adjusted position on the rod by means of a lock nut 104. Since the yieldable grid unit A is fixedly connected to the piston 32 of the pressure measuring device D, by piston rod 33, regardless of the amount of movement of piston 32 in the cylinder 31 in a direction toward the left, Fig. 8, when the tenderness of a batch of peas in chamber C is being determined, the grid unit A will return to the same position after each testing operation, since the return movement of the grid unit will be arrested when stop nut 103 engages the ear 102. In the same manner the return stroke of piston 32 is also limited and, consequently, variations in the registry of the pointer 45 of the pressure indicating gauge 41 when it returns to starting position, are avoided.

The positively movable grid unit B (Figs. 1, 2, 3 and 4), comprises a plurality of thin grid plates 105 which constitute shear blades. These shear blades 105 have their longitudinal side edges mounted in the guideways 78 for free sliding movement of the blades back and forth in the guideways and through the spaces provided therefore between the grid plates 75 and 80 of the yieldable grid unit A. Since the guideways 78 have a greater length than that of the chamber C, said guideways are in constant engagement with the shear blades 105 for guiding said shear blades in alignment with the slots or openings 76 and 81 heretofore described. The corners of the inner end portions of the shear blades 105 are formed with pointed extensions 105ª adapted to deflect peas within the chamber C away from the guideways 78 when the grid unit B is moved into the chamber during testing, and this construction assists in keeping the guideways clean and preventing binding of the blades therein. The shear blades 105 are of sufficient thinness relative to the size and character of a product being tested by the apparatus, so as to shear rather than mash the product. In case of peas I have found that shear blades having a thickness of .109" are satisfactory.

The rear end portions of the shear blades 105 are loosely secured in a holder 106 rigidly fixed to the forward end of a piston rod 107 of the power transmitting mechanism E (Fig. 4). This shear blade holder 106 of the positively movable grid unit B comprises an elongated vertically disposed member having a vertically disposed nose 108 which is provided with a series of blade receiving slots 109. The slots 109 are wider than the thickness of the blades 105 so as to provide a floating clearance between the top and bottom walls of the slots and said blades, as shown in Fig. 4. It is therefore apparent that the blades 105 loosely fit into the slots 109 without affecting the alignment of the blades with respect to the guideways 78 and, consequently, will freely slide therein without danger of any binding therebetween.

The blades 105 are retained within the slots 109 by means of a vertically disposed rod 110 which is inserted in aligned openings 111 in the blades and is mounted in aligned notches 112 formed in a wall 113 of the nose 108 (Fig. 3). Threadedly mounted on the upper end of the rod 110, is a nut 114 which rests on top of the holder 106 and supports the rod 110 in position in said holder. The openings 111 in the blades 105 are somewhat larger than the rod 110 so that the blades are but loosely retained by the rod for free floating movement with respect thereto without danger of binding. The notches 112 in the nose 108 are also larger than the rod 110 so as to provide a loose connection between the holder and the rod and the depth of the slots 109 is such that when the shear blades 105 are advanced inwardly of the yieldable grid unit A, no force is applied to the rod, the operating force being applied directly to the shear blades 105 through contact of their ends with the inner walls 115 of the slots 109. On the other hand, when the shear blades 105 are pulled in an outward direction of the yieldable grid unit A, the pulling force is applied to the rod 110.

From the foregoing it will be noted that the yieldable grid unit A provides a chamber C for a batch of peas, said chamber being substantially rectangular or hexahedronal in outline and having opposed rear and front walls formed of aligned shearing and scraping blades, respectively, said blades being spaced apart to provide a series of aligned elongated slots therebetween for receiving and guiding the series of shear blades for sliding movement through the chamber to shear a batch of peas therein. Moreover, it should be particularly noted that the shear blades are loosely connected to the holder of the positively movable grid so as to permit floating movement therebetween and, therefore, the alignment of the blades with respect to the guideways is assured, binding therebetween eliminated, and friction between them minimized with a result that the resistance of the peas to the shearing action of the blades will more accurately be reflected upon the dial of the gauge 41.

Arranged transversely of the apparatus, and mounted on the guide rods 27, 28 and piston rod 107, is a guide member 119 for the positively movable grid unit B. The guide 119 is disposed adjacent to the shear blade holder 106, and is fixed to the piston rod 107 by set screw 120 (Figs. 3 and 4) for reciprocating movement therewith in directions lengthwise of the guide rods 27, 28. Each end portion of the guide member 119 is also provided with bushed openings 121 (Fig. 1) through which the guide rods 27, 28 extend so that the guide member is freely slidable on the supports provided by said guide rods. The purpose of the guide member 119 is to support the outer end portion of the piston rod 107 so that said piston rod is retained at all times in proper alignment with the longitudinal center line of the cylinder block 23 of the power transmitting mechanism E. The guide member 119 also prevents any rotation or sagging of the piston rod 107 which might tend to misalign the holder 106 with the shear blades 105 and cause binding.

As shown in Figs. 9 and 11, the cylinder block 23 of the power transmitting mechanism E is formed with a cylinder 125 for a piston 126 mounted on the outer end of the piston rod 107 heretofore referred to. One end of the cylinder 125 is closed by a wall 127 formed integral with the cylinder block 23, and the other end of said cylinder is closed by a removable cover 128 which is secured to the end of the cylinder block 23, by securing elements 129 (Fig. 1). The end wall 127 of the cylinder is formed with a boss 130 which extends outwardly therefrom. The boss 130 is formed with an opening through which the piston rod 107 extends, the joint therebetween being sealed by means of a packing gland having a packing ring 131 threadedly mounted on the outer end portion of the boss 130 in well known manner.

The movement of the piston 126 is automatically stopped at the end of each stroke of the piston, by a poppet valve device, generally indicated at 135 in Figs. 9 and 11.

The valve device 135 comprises two tapered poppets 136, 137, fixedly mounted on the opposite ends of a stem 138, slidably mounted in a bearing 139 extending through the body of the piston 126. The poppet 136 is disposed in chamber 140 at one side of the piston 126 and is arranged to engage a valve seat 141 formed in the outer portion of a recess 142 counterbored in the side of the piston facing chamber 140. The poppet 137 is disposed in chamber 143 at the side of the piston 126 opposite to the side in which the poppet 136 is located, said poppet 137 being arranged to engage a valve seat 144 formed in the outer portion of a recess 145 counterbored in the side of the piston facing chamber 143.

The valve stem 138 has such a length that when poppet 136 is seated against valve seat 141, poppet 137 will be unseated from valve seat 144, and when poppet 137 is seated against valve seat 144, poppet 136 will be unseated from valve seat 141.

The poppets 136, 137 are arranged to control communication through the piston 126 from chamber 140 to chamber 143, and vice versa, provided by a plurality of passageways 146 which are formed through the body of said piston. As shown in Fig. 13, the passageways 146 are radially disposed with respect to the longitudinal center line of the valve stem 138, said passageways being spaced apart equal distances from each other and terminating at each end within the confines of the recesses 142 and 145, respectively, so that when either poppet 136, 137 is seated, communication through the piston 126 will be cut-off. The manner in which the poppet valve device 135 functions to automatically control the movements of the piston 126 will be hereinafter described in connection with the description of the operation of the power transmitting mechanism E.

In the normal inactive position of the parts of the testing machine, the yieldable grid unit A is held by stop nut 103 in the position shown in Figs. 1 and 4. The positively movable grid unit B is disposed in a retracted position with respect to the yieldable grid unit A, and, consequently, the piston 126 of the power transmitting mechanism E is disposed at the right hand end of cylinder 125 (Fig. 9), being spaced a slight distance from the inner surface of cover 128. When the piston 126 is disposed in the above manner with respect to the end of the cylinder 125, one end of the stem 138 of the poppet valve device 135 abuts the inner surface of the cover 128, whereby both poppets 136, 137 are unseated from the valve seats 141, 144, respectively. Consequently, when the testing mechanism is inactive, operating fluid is permitted to flow through the piston 126.

In the present instance the operating fluid for the power transmitting mechanism E is oil, and the oil is continuously circulated through a closed circuit to be hereinafter described, by a pump 151, constantly driven by an electric motor 152, Figs. 1 and 2. The closed circuit of the operating fluid includes the cylinder 125, and the flow of operating fluid through said cylinder is under the control of a valve device 153 mounted on top of the cylinder block 23. For convenience, the pump 151 and the electric motor 152 may be suspended from the underside of the base 11 of the frame of the machine, the motor 152 being connected to the pump in driving relation by shaft 154.

The control valve device 153 comprises a housing 157 formed integrally with the cylinder block 23 of the power transmitting mechanism E, said housing having a cylindrical chamber 158 therein for a valve element 159. As shown in Figs. 9, 11 and 14, the longitudinal center line of the valve chamber 158 is arranged at right angles with respect to the longitudinal center line of the power cylinder 125. Leading from one side of the valve chamber 158 and connected to the power cylinder 125 at the outer end of the chamber 140, is a passageway 160 (Figs. 9 and 11), and leading from the opposite side of said valve chamber and connected to the power cylinder 125 at the outer end of chamber 143, is a passageway 161. The passageways 160, 161 provide fluid distribution passageways connected to the opposite sides of the valve chamber 158 in spaced relation to the ends of said chamber, and the valve element 159 is arranged to control the flow of operating fluid through the passageways 160, 161 in the manner to be hereinafter more fully described.

As shown best in Fig. 14, mounted on one end of the control valve housing 157 is a cap 162, and mounted on the opposite end of said housing and forming an extension thereof is a casing 163 for a relief valve device. The casing 163 has a pair of conduits 164, 165 formed lengthwise thereof, the inner ends of said conduits terminating at an end of the valve chamber 158. Leading from the pressure side of the oil circulating pump 151 and connected to the outer end of the conduit 164, is a conduit 166. Connecting the intake side of the pump 151 and the outer end of the conduit 165, is a conduit 167. The arrows F and R in Figs. 2 and 14, indicate the direction of fluid flow through the conduits 166, 167, respectively, conduit 166 being the supply or feed conduit, and conduit 167 being the return conduit.

Oil for maintaining the parts of the power transmitting mechanism E full at all times is obtained from a tank 168 having its outlet connected to the return conduit 165, by pipe 169, as shown in Fig. 15. The tank 168 has a cover which is removable when it is desired to replenish the supply of oil in said tank. Since the tank is located above the control valve device 153, oil will flow by gravity therefrom into conduit 165 so that the cylinder 125, control valve device 153, pump 151, and the conduits connecting the same will at all times be full of operating fluid.

The valve element 159 of the flow control valve device 153 comprises a rotatable valve or gate having a length less than the length of the valve chamber 158 (Fig. 14). One end wall of the valve 159 is arranged to abut the inner face of the relief valve casing 163, and the other end wall of the valve is spaced from the inner face of the cap 162 so that a cavity 170 is provided at one end of the valve chamber 158. A valve stem 171 extends from the end of the valve 159 facing the cavity. The valve stem 171 passes through an opening 172 formed in the cap 162 and boss 173 projecting outwardly from the cap, and terminates at a suitable distance beyond the outer end of said boss. The joint between the valve stem 171 and the cap 162 is sealed by means of a packing gland having a packing nut 174 threadedly mounted on the outer end portion of the boss 173.

The gate or valve element 159 is normally retained with its inner end abutting the inner face of the relief valve casing 163, by means of a combined compression and torsion spring 175 which encircles the portion of the valve stem disposed within the cavity 170, one end of said spring being secured to the stationary cap 162 and the other end being fixed to the gate 159, (Fig. 14).

Formed longitudinally within the body of the valve 159, in spaced relation to the longitudinal center line thereof, are passageways 181, 182, 183 and 184. These passageways communicate with the conduits 164, 165, and extend only part way through the valve. The passageways 181, 182 terminate at a port 185, and the passageways 183, 184 terminate at a port 186. The ports 185, 186 are formed at right angles to the longitudinal axis of the valve 159 and are arranged to connect the passageways 181, 182, 183 and 184 with the passageways 160, 161 so that oil under pressure from the pump 151 will be supplied to chambers 140, 143 for actuating the piston 126, of the power transmitting mechanism in the manner to be hereinafter described.

Within the casing 163 is a pressure relief valve device comprising a ball valve 190 backed by a predetermined strength spring 191 (Figs. 14 and 15), variable by adjusting means 192. The ball 190 is normally held by spring 191 against a seat 193 to cut-off communication from conduit 164 to conduit 165, through by-pass conduit 194 in the valve device. The pressure of spring 191 is greater than the normal pressure of the oil flowing through the conduit 164 from the pump 151 toward the flow control valve device 153 and the operating or power cylinder of the machine.

When the pressure of the oil in the line from the discharge side of the pump 151 increases a predetermined amount above the pressure of spring 191 against ball valve 190, such for instance as when the movement of the movable grid unit B is impeded by the shear blades 105 thereof encountering sticks, stones, or other hard foreign matter which may have been deposited with the batch of peas in chamber C, the ball 190 will be unseated to establish communication through by-pass conduit 194 and from thence through the return line 165, 167 to the intake side of pump 151. In this way, whenever the resistance to the movement of the operating piston 126 increases above a predetermined amount, the continuous flow of operating fluid toward the piston chambers in cylinder 125 temporarily passes through a circuit which by-passes the flow control valve device 153 and the power or operating cylinder 125, until the obstruction to the movement of the piston 126 is removed and the fluid pressure reduces and the ball 190 is seated by spring 191 to cut-off communication through the by-pass conduit 194.

For the purpose of preventing an endwise movement of the gate or valve 159 within the valve chamber 158 due to excess pressure of the oil delivered by the conduit 164 to said valve chamber as opposed by the pressure of the torsion spring 175 within the cavity 170 acting against the outer end of said valve, a by-pass conduit 196 (Figs. 9, 11 and 14) is provided around the valve 159. The by-pass conduit 196 is formed in the body of the control valve device 153 and has a port 197 at one end in communication with the joint between the inner end of the fluid supply conduit or passageway 164 and the rear face 198 of the valve 159, and terminates at the other end at cavity 170. Thus the cavity 170 is filled with oil supplied by leakage around the joint referred to and passing through the by-pass 196 so that the pressure of oil in the cavity, plus the pressure of the torsion spring 175 maintains the rear face 198 of the valve 159 against the face 199 of the relief valve casing 163 at all times.

Mounted on the outer end portion of the valve stem 171, is a disc 201 which is made rigid with said valve stem by means of a key 202 (Figs. 10 and 12). Projecting radially from the periphery of the disc 201, is a handle 203, by which the valve 159 is adapted to be manually operated in the manner to be hereinafter described. A portion of the periphery of the disc 201 is reduced radially, as indicated at 204, to provide a pair of shoulders 205, 206, the shoulder 206 being extended inwardly of the body of said disc to provide a notch.

A locking member 207 is pivotally mounted on the cylinder block 23, as indicated at 208, Fig. 1, one end of said locking member being formed with a nose which constitutes a detent 209. When the valve 159 is in one position the detent 209 is adapted to engage shoulder 205 and when the valve is in another position the detent is adapted to engage notch 206. Normally the torsion spring 175 urges the valve 159 in the direction in which the detent 209 engages the shoulder 205.

The lower end portion of the locking member 207 has an opening 210 formed therein for loosely receiving a rod 211 as best shown in Fig. 1. The outer portion of the rod 211 which extends through the opening 210 is threaded to receive nuts 212 which are positioned on each side of the locking member 207. The rod 211 is slidably mounted in a slot 213 formed lengthwise in the guide rod 27 (Figs. 3 and 5), the inner end of rod 211 being bent downwardly to provide a finger 214 which is disposed between a boss 70 of the grid unit A and an end of the guide member 119.

Surrounding the rod 211 and bearing at one end against nut 212 and bearing at the other end against the surface of ear 24 of the stationary cylinder block 23 of the power transmitting mechanism E, is a coil spring 215 which is arranged to maintain the detent 209 normally in engagement with the surface of the cut out portion 204 of disc 201 so that said detent will engage shoulder 205. The nuts 212 are threadedly mounted on the rod 211 so that a loose connection is provided between the locking member 207 and the rod 211.

During intervals between tests, when the testing machine is in an operative but inactive condition, i. e., when the electric motor 152 is operating the pump 151, the parts are positioned so that the piston 126 is disposed adjacent to the right hand end of the cylinder 125 but in slightly spaced relation to the wall of cover 128, as shown in Fig. 9, and as a consequence the positively movable grid unit B is retracted with respect to the yieldable grid unit A, as shown in Figs. 1, 3 and 4. At the same time the handle 203 is disposed in the position shown in Figs. 1 and 10, so that the disc 201 of the flow control valve device 153 is positioned with the shoulder 205 thereof in engagement with the detent 209. The gate or rotatable valve 159 is thus disposed in the position shown in Fig. 9, whereby port 185 connects passageway 181 with passageway 161, and port 186 connects passageway 183 with passageway 160.

As shown in Fig. 14, when the parts are positioned as just described, passageway 181 registers with the conduit or passageway 164 leading from the pressure side of the pump 151 and passageway 183 registers with the return conduit or passageway 165 to the pump. The passageways 182 and 184 are both blocked off by the face 199 of the relief valve casing 163. Referring now to Figs. 9 and 14, oil under pressure from the pump 151 thus flows through the closed circuit including passageways 166, 164, 181, port 185, and passageway 161 to piston chamber 143, and from thence past unseated poppet valves 136, 137 through passageways or ports 146, to piston chamber 140, and from thence the oil returns to the intake side of the pump 151, through passageway 160, port 186, and passageways or conduits 183, 165 and 167.

When it is desired to test a batch of peas with the machine of the present invention, the upper cover plate or slide 85 is disposed in the position shown in Fig. 1, so as to register the bottom of the feed hopper or funnel 87 with the top of the chamber C, and the base plate 93 is disposed in position to close the bottom of the chamber. The chamber C is then completely filled with peas and is then closed at the top by shifting the cover plate or slide 85 to the position shown in Figs. 2 and 4.

The handle 203 of the flow control valve device 153 is then manually moved from the position shown in Figs. 1 and 10 to the position shown in Fig. 12. This movement of the handle is through an angle of approximately 90° and the gate or valve 159 is turned from the position shown in Fig. 9 to the position shown in Fig. 11. The passageways 181 and 183 are now both blocked off by the face 199 of the relief valve casing 163 and passageways 184, 182 are registered with the conduits 164, 165 respectively. Oil under pressure from the pump 151 now flows to piston chamber 140 through conduits or passageways 166, 164, 184, port 186, and passageway 160, and piston chamber 143 is connected to the intake side of the pump 151 through passageway 161, port 185 and passageways 182, 165 and 167. In passing through the passageways 146 of the piston 126 at the initiation of the reversal of flow through the power cylinder, the oil acts against poppet 137 which is not restrained and will yield under pressure, with the result the poppets 136, 137 are forced leftward of their positions shown in Fig. 9 thereby seating poppet 136 against its seat 141 and cutting off communication through the passageways 146 in the piston 126. The pressure of oil builds up in piston chamber 140 and consequently piston 126 is forced toward the left into the position shown in Fig. 11. During the movement of the piston 126 in the left hand direction, oil in chamber 143 flows through passageways 161, port 185 and passageways or conduits 182, 165 and 167 toward the intake side of pump 151.

When the piston 126 is thus moved in a left hand direction, it pushes the shear blades 105 of the grid unit B into the mass of peas in chamber C. The peas are first compacted by the shear blades and when the peas have been compacted into a substantially solid mass, shearing commences and the shear blades 105 pass through the mass of peas within chamber C.

The resistance to both compacting and shearing is transferred to the yieldable grid unit A and from thence to the piston 32 of the pressure measuring device D. However, the movement of piston 32 within cylinder 31 is very slight and occurs mainly during the actual shearing of the peas within chamber C by the shear blades 105 of the grid unit B. The movement imparted to piston 32 when the compacted mass of peas within chamber C are being sheared in the above described manner displaces the operating fluid in chamber 40 so that both pointers 44, 45 of the pressure gauge 41 are moved forwardly across the face of the dial 43 to the graduation registering the amount of resistance. At the completion of the shearing operation, pointer 44 will immediately return to the starting position, while pointer 45 will remain in registering position until either advanced further by pointer 44 during subsequent tests or returned to the starting position by the operator turning nut 47 on the outer end of shaft 46 in the manner heretofore described.

It will be understood that the length of the stroke of piston 126 is sufficient to push the front edges of the shear blades 105 through the plates or shearing blades 75 of the yeldable grid unit A to the position indicated by broken lines 216, Fig. 3. The movement of the piston 126 is automatically stopped at the end of its stroke toward the left in the following manner. During the testing operation, poppet 136 is seated against its seat 141. When the piston 126 approaches end wall 127 of cylinder 125, the end of the valve stem 138 adjacent poppet 137 abuts the surface of said end wall as seen in Fig. 11. This holds the poppet valve device 135 stationary while the piston 126 continues moving towards the end wall 127. As the result the poppet 136 is unseated from its seat 141, thereby establishing communication from piston chamber 140 to piston chamber 143, through the passageways 146. As soon as communication is thus established through the piston 126 the pressure of oil in the chambers 140, 143, at the opposite sides of the piston 126 becomes equalized, with the result the piston 126 comes to rest while both poppets 136 and 137 are unseated. The piston is then automatically returned to its starting position in the manner now to be described.

At the end of the movement of the piston 126 toward the left to telescope the grid unit B within the grid unit A in the above described manner, an end of the guide member 119 engages the finger 214 on the end of the rod 211 (Fig. 1) and moves said rod and the lower end of the locking member 207 toward the left against the forces of spring 215. The upper end of the locking member 207 is thereby swung in a clockwise direction so that detent 209 is disengaged from notch 206. Torsion spring 175 then turns the gate or flow control valve 159 from the position shown in Figs. 11 and 12 to the position shown in Figs. 9 and 10, where the detent 209 engages shoulder 205 to retain valve 159 in position. Oil under pressure from pump 151 is now supplied to piston chamber 143 through conduits or passages 166, 164, 181, port 185, and passageway 161. In passing through the passageways 146 of the piston 126 from chamber 143 to chamber 140 at the initiation of the reversal of flow through the power cylinder, the oil acts against the poppet 136, which is not restrained and will yield under pressure, with the result the poppets 136, 137 are forced toward the right, thereby seating poppet 137 against its seat 144 and cutting off communication through the passageways 146 in the piston 126. The pressure of oil builds up in piston chamber 143 and consequently piston 126 is forced toward the right, the oil in chamber 140 returning to the intake side of the pump 151, through passageway 160, port 186, and passageways or conduits 183, 165 and 167.

The movement of the piston 126 toward the right to withdraw the grid unit B from the grid unit A, is automatically stopped when the right hand end of the valve stem 138 strikes the inner surface of the cover 128, Fig. 9. The poppet valve device 135 is held stationary while the piston 126 continues moving toward the cover 128 until the poppet 137 is unseated from its seat 144, thereby establishing communication from chamber 143 through passageways 146 to chamber 140, so that the pressure of oil in the chambers 140, 143, at the opposite sides of the piston 126 becomes equalized, and the piston 126 comes to rest. This completes a cycle of operation by which a batch of peas is tested in the machine. The parts of the power transmitting mechanism E are now, as shown in Fig. 9, in position for the next test.

When the piston 126 makes its return stroke in the manner above described the shearing blades 105 are pulled by rod 110 outwardly with respect to the yieldable grid unit A. Due to the manner in which the shearing blades 105 are slidable between the plates 75 and 80 of the grid unit A, all solid matter, such as pulp or the like which may collect on the shearing blades 105 during the testing operation will be removed therefrom by the shear blades 75 and the scraping blades 80 and will be deposited in the mass of material within chamber C. In fact the plates 75, and 80 function as means for preventing the accumulation of solid matter on shearing blades 105 during both the forward and the rearward movements of the shearing blades 105 through chamber C, so that at all times the shearing blades are kept free of solid matter.

When the cycle of operation of the power transmitting mechanism E has been completed, the waste material within chamber C should be removed. The cover plate 85 and the base plate 93 are shifted to the position in which the top and bottom of the chamber are open. The material will then discharge from the chamber through an opening 218 in the base and slide down chute 219 into a suitable receptacle (not shown) positioned beneath the bottom of said chute, Figs. 1 and 5. After the chamber C has been cleaned of all waste material, base plate 93 should be shifted to the position to close the bottom of said chamber (Fig. 4) and the machine is now conditioned for another batch of peas.

Having now described my invention, and in what manner the same may be used, what I claim as new and desire to protect by Letters Patent is:

1. An apparatus for testing the tenderness of a product comprising a yieldably mounted grid unit formed to provide a receptacle provided with a series of aligned shearing slots in opposite end wall thereof, a positively driven grid unit comprising a gang of shear blades adapted for telescopic registration with said slots, means for confining a product to be tested between said grid units, means in the opposite side walls of said receptacle forming guideways in which said shear blades are slidably mounted for reciprocation into and out of shearing relation with the slots of said yieldable grid unit, drive means for actuating said driven grid unit along said guideways to shear through the product confined between the grid units, and means for measuring the resistance of the product to the shearing action of said blades.

2. An apparatus for testing the tenderness of a product comprising a yieldably mounted grid unit providing a receptacle having a series of shearing slots in opposite end walls thereof, a positively driven grid unit comprising a gang of shear blades adapted for telescopic registration with said slots, means for confining a product to be tested between said grid units, means forming guideways in opposite side walls of said receptacle in which said shear blades are slidably mounted for reciprocation into and out of shearing relation with the slots of said yieldable grid unit, drive means for actuating said driven grid unit to shear through the product confined between the grid units, means loosely connecting said shear blades to the drive means for independent floating movement of the individual blades with respect to said drive means, and means for measuring the resistance of the product to the shearing action of said blades.

3. An apparatus for testing the tenderness of a product comprising a receptacle having a chamber therein for the reception of the product to be tested, said receptacle being provided with a plurality of slots in an end wall thereof and a series of aligned grooves in opposite side walls, a gang of shear blades slidably mounted in said grooves for reciprocation through said slots and the product in said chamber, means for reciprocating said gang of shear blades, and means for measuring the resistance of said product to the shearing action of said blades.

4. An apparatus for testing the tenderness of a product comprising a receptacle having a chamber therein for the reception of the product to be tested, said receptacle being provided with a plurality of slots in an end wall thereof and a series of aligned grooves in opposite side walls, a gang of shear blades slidably mounted in said grooves for reciprocation through said slots and the product in said chamber, drive means for actuating said gang of shear blades, means loosely connecting said shear blades to the drive means for independent floating movement of the individual blades with respect to said drive means, and means for measuring the resistance of said product to the shearing action of said blades.

5. An apparatus for determining the tenderness of a product comprising a female grid member having a chamber for receiving the product to be tested, guideways at opposite sides of said chamber, and a male grid member having a series of grid plates slidable within said guideways and movable through the chamber for shearing the product therein.

6. An apparatus for determining the tenderness of a commodity, comprising a member having a chamber therein for receiving the commodity to be tested, said chamber having slots in opposite end walls thereof and guideways in its opposite side walls, a series of plates slidable within said guideways for movement through said slots for shearing the commodity within said chamber, power means for forcing the plates through the commodity in said chamber, and means for indicating the resistance offered by the commodity with the chamber to the shearing action of said plates.

7. An apparatus for determining the tenderness of a product comprising a female grid member having front and rear vertically spaced apart grid plates and a chamber therebetween for receiving the product to be tested, guideways at each side of said chamber arranged in alignment with the spaces between said grid plates, and a male grid member having a series of flat grid plates slidable within said guideways and movable through the spaces between said front and rear grid plates for shearing the product within said chamber.

8. An apparatus for determining the tenderness of a product, comprising a member having a chamber formed therein for containing the product to be tested, two opposed end walls of said chamber having aligned slots formed therein and two opposing side walls of said chamber having opposing guideways formed therein in alignment with the slots in said end walls, a series of plates having their edges constantly in engagement with corresponding opposing guideways and being slidable through the slotted walls of said member for shearing the product within said chamber, and means connected to said plates for forcing the plates through the product in the chamber.

9. An apparatus for testing the tenderness of a product comprising a female member having a chamber for receiving the product to be tested, shearing elements in said female member comprising spaced plates in one wall thereof and aligned spaced scraping plates in the opposite wall thereof, the walls of said female member extending between said spaced plates and scraping blades being provided with guideways formed in registration with the spaces between said plates and blades, a male member having shear blades slidably mounted in said guideways for movement past said shearing elements to shear the product within said chamber, operating means for said male member, and means for measuring the resistance of the product to the shearing action of said blades.

10. An apparatus for testing the tenderness of a product, comprising a member having a chamber therein for receiving a batch of the product to be tested, said member having guideways formed in opposed walls of its chamber, a series of shear blades slidably mounted in said guideways, said member having one end wall of said chamber provided with shear slots adapted to receive corresponding shear blades, a holder, means for loosely connecting the outer end portions of said shear blades to said holder whereby the blades are floatingly mounted in the holder, means for imparting a straight line movement to said holder and the blades loosely connected thereto whereby the blades are pushed through said chamber and into the slotted end thereof to shear the product therein, and means for indicating the amount of resistance the product within said chamber offers to the shearing action of said blades.

11. An apparatus for determining the tenderness of a commodity, comprising means forming a chamber for receiving the commodity, said chamber having a plurality of slots in a wall thereof, a series of flat plates slidable within said slots for shearing the commodity within said chamber, a reciprocable holder for pushing the plates through the commodity in said chamber, and means loosely connecting said plates with said holder for independent floating movement of the individual plates with respect to said holder and adapted to pull the plates outwardly of the chamber.

12. An apparatus for determining the tenderness of a commodity, comprising a housing having a chamber for receiving the commodity, said chamber having a front wall, a rear wall, side walls, a top and a bottom, slots formed in the front and rear walls in the same horizontal plane, longitudinally extending ribs formed on the side walls and arranged to provide guideways located in the same horizontal plane as the plane of said slots, and shear blades movable through said slots to shear the commodity within said chamber, the side edges of said shear blades being mounted in the guideways between the longitudinally extending ribs and being supported thereby during movements thereof through said chamber.

13. An apparatus for determining the tenderness of a product, comprising a member having walls providing a chamber for receiving the product to be tested, said member having aligned slots in two of the opposed walls thereof, guideways disposed at right angles with respect to said slots and extending from the rear slotted wall forwardly beyond the front slotted wall of said member, a series of flat plates mounted in said guideways and slidable through said slots, means connected to said plates for moving the same through said chamber, said plates being constantly in engagement with said guideways whereby the plates are guided in alignment with said slots, and means for indicating the resistance offered by the product to the shearing action of said plates.

14. An apparatus for determining the tenderness of a commodity, comprising means providing a chamber for receiving the commodity, said chamber having slots in opposed end walls thereof and corresponding guideways in opposed side walls of said chamber in alignment with said slots, a series of flat plates slidable within said guideways for movement through said slots for shearing the commodity within the chamber, means connected to said plates for forcing the plates through the commodity in said chamber, and means for measuring the resistance of the commodity to the shearing action of said plates.

15. An apparatus for determining the tenderness of a commodity, comprising a member having a chamber for receiving the commodity and provided with shear slots in one of its end walls, said chamber having guideways in opposed walls thereof in alignment with the shear slots in said end wall thereof, a series of flat plates slidable within said guideways for shearing the commodity within said chamber, a holder, means for loosely connecting said flat plates to said holder for independent floating movement of the individual plates with respect to said holder, power means connected to said holder for forcing the plates through the commodity in said chamber, and means for indicating the resistance offered by the commodity within said chamber to the shearing action of said plates.

16. An apparatus for determining the tenderness of a product comprising a female grid member having front and rear grid plates and a chamber therebetween for receiving the product to be tested, a male grid member having a series of flat grid plates slidable between the grid plates of said female member for shearing the product within said chamber, fluid pressure operated means operable at a predetermined pressure for operating the male member, means for rendering said fluid pressure operated means inoperative when the operating pressure therefor exceeds a predetermined amount, and means actuated by said female member for indicating the amount of resistance of the product within said chamber to the shearing action of said male grid member.

17. An apparatus for determining the tenderness of a commodity, comprising means forming a chamber for receiving the commodity, said chamber having a plurality of slots in a wall thereof, a series of flat plates slidable within said slots for shearing the commodity within said chamber, a reciprocable holder for receiving the outer ends of said plates and adapted to push the plates through the commodity in said chamber solely by engagement of surfaces of said holder with surfaces of said plates during movement of said holder in one direction, and means for loosely connecting said plates to said holder, said last named means being adapted to exert a pulling force on said plates to withdraw the plates from the chamber during movement of said holder in the opposite direction.

18. A testing machine for determining the tenderness of a product comprising a yieldable grid unit having a chamber therein for receiving the product, said chamber having guideways in opposed walls thereof, a series of blades slidably mounted in said guideways, a holder having grooves therein for loosely receiving the outer end portions of said blades, means loosely connecting said blades with said holder for independent floating movement of the individual blades with respect to said holder, means for rigidly mounting said holder for rectilinear movements, means connected to said holder for moving said holder in one direction whereby said blades are pushed by the holder through said chamber to shear the product therein, said means connecting the blades with the holder being adapted to exert a pulling action on the blades to withdraw the blades from the chamber when the holder is moved in the opposite direction, and means connected to said yieldable grid unit for indicating the amount of resistance the product within said chamber offers to the shearing action of said blades when the blades are pushed by the holder therethrough.

19. An apparatus for determining the tenderness of a product comprising a yieldable female member having a chamber therein for receiving a mass of the product to be tested, a male member having a series of grid plates slidable through the chamber of said female member for shearing the product within said chamber, means actuated by said female member when it yields to the resistance of the product within said chamber to the shearing action of said grid plates for indicating the tenderness of the product, fluid pressure operated power transmission mechanism for operating the male member, a closed fluid circuit through which operating fluid for said power transmission constantly flows at a predetermined pressure, a valve device for controlling the flow of fluid through the closed circuit so as to effect a single forward movement and a single rearward movement of said male member with respect to said female member when a test is being made, and means for passing the operating fluid through the circuit when the pressure of the operating fluid exceeds a predetermined amount during operation of the power transmitting mechanism so that the power transmitting mechanism is made inoperative.

20. An apparatus for determining the tenderness of a product comprising a yieldable female member having a chamber therein for receiving a mass of the product to be tested, a male member having a series of grid plates slidable through the chamber of said female member for shearing the product within said chamber, means actuated by said female member when it yields to the resistance of the product within said chamber to the shearing action of said grid plates for indicating the tenderness of the product, fluid pressure operated power transmission mechanism for operating the male member, a closed fluid circuit through which operating fluid for said power transmission constantly flows at a predetermined pressure, a valve device for controlling the flow of fluid through the closed circuit so as to effect a single forward movement and a single rearward movement of said male member with respect to said female member when a test is being made, and means for passing the operating fluid flowing in the closed circuit so that the operating fluid by-passes the flow control valve device and the power transmitting mechanism when the pressure of the operating fluid exceeds a predetermined amount.

CHARLES E. KERR.

REFERENCES CITED

The following references are of record in the file of this patent:

UNITED STATES PATENTS

| Number | Name | Date |
|---|---|---|
| 2,224,248 | Blum et al. | Dec. 10, 1940 |
| 2,227,216 | Christel | Dec. 31, 1940 |
| 2,227,226 | Martin | Dec. 31, 1940 |
| 2,279,069 | Simmons | Apr. 7, 1942 |
| 2,403,194 | Roberts | July 2, 1946 |